United States Patent [19]

Kato et al.

[11] Patent Number: 5,528,382
[45] Date of Patent: Jun. 18, 1996

[54] REPRODUCTION APPARATUS FOR VIDEO SIGNALS ACCOMPANIED BY CONTROL INFORMATION

[75] Inventors: Masato Kato, Inagi; Akio Aoki, Tokyo; Makoto Shimokoriyama, Kawasaki; Yoshiki Ishii, Yokohama; Yasuyuki Tanaka, Tokyo, all of Japan

[73] Assignee: Canon Kabushiki Kaisha, Tokyo, Japan

[21] Appl. No.: 338,274

[22] Filed: Nov. 14, 1994

Related U.S. Application Data

[63] Continuation of Ser. No. 909,699, Jul. 7, 1992, abandoned.

[30] Foreign Application Priority Data

| Jul. 9, 1991 | [JP] | Japan | 3-168373 |
| Sep. 5, 1991 | [JP] | Japan | 3-254678 |

[51] Int. Cl.$^6$ .................. H04N 5/76; H04N 5/78
[52] U.S. Cl. ................. 358/335; 360/10.1
[58] Field of Search .................. 358/312, 310, 358/335; 360/10.1, 10.2, 10.3, 9.1; 348/384; H04N 5/76, 5/783, 5/78, 9/79, 7/18, 7/12

[56] References Cited

U.S. PATENT DOCUMENTS

| 4,121,242 | 10/1978 | Janko | 358/319 |
| 4,389,678 | 6/1983 | Mizukami et al. | 360/10.3 |
| 4,486,692 | 12/1984 | Sonoda et al. | 358/314 |
| 4,733,312 | 3/1988 | Morimoto | 360/10.1 |
| 4,891,699 | 1/1990 | Hamada et al. | 358/336 |
| 4,933,774 | 6/1990 | Ishimaru | 358/335 |
| 4,987,489 | 1/1991 | Hurley et al. | 358/105 |
| 5,113,262 | 5/1992 | Strolle et al. | 358/310 |
| 5,136,395 | 8/1992 | Ishii et al. | 358/335 |
| 5,140,437 | 8/1992 | Yonemitsu et al. | 358/342 |
| 5,204,754 | 4/1993 | Fukatsu et al. | 358/339 |

FOREIGN PATENT DOCUMENTS

| 61-1105985 | 5/1986 | Japan . |
| 63-228894 | 9/1988 | Japan . |
| 1200790 | 11/1989 | Japan . |
| 4207282 | 7/1992 | Japan . |
| 4311177 | 11/1992 | Japan . |
| 4314280 | 11/1992 | Japan . |

OTHER PUBLICATIONS

Anonymous, "Slow motion using longitudinal recording and forward/reverse tape transportation," *Research Disclosure*, no. 199, Nov. 1980, pp. 445–448.

Primary Examiner—Thai Q. Tran
Attorney, Agent, or Firm—Robin, Blecker Daley and Driscoll

[57] ABSTRACT

An apparatus for reproducing video signals from the recording medium in which the video signals to which the control information pertaining to the image plane corresponding to every image plane is added are previously recorded. Upon reproduction of the video signals in accordance with an array pattern of the image plane different from the pattern used at the time of recording, at least a portion of the control information added to the video signals reproduced by the reproducing apparatus is changed into other information in accordance with the above-mentioned pattern to obtain the control information used for processing the video signals, thereby allowing an excellent image plane to be obtained.

33 Claims, 11 Drawing Sheets

FIG. 3 (PRIOR ART)

| N+3 (STILL IMAGE) | N+2 (SCENE CHANGE) | N+1 (PANNING/TILT) | N (MOVIE IMAGE) |
|---|---|---|---|
| MODE: STILL MODE | SCENE CHANGE MODE | MOVIE MODE | MOVIE MODE |
| VECTOR: (0, 0) | (0, 0) | (−x, −y) | (0, 0) |
| # | # | # | # |

EACH NORMAL DATA Dm'

EACH DATA Dm IN REVERSE REPRODUCTION

| MODE: SCENE CHANGE | MOVIE MODE | MOVIE MODE | STILL MODE |
|---|---|---|---|
| VECTOR: (0, 0) | (x, y) | (0, 0) | (0, 0) |

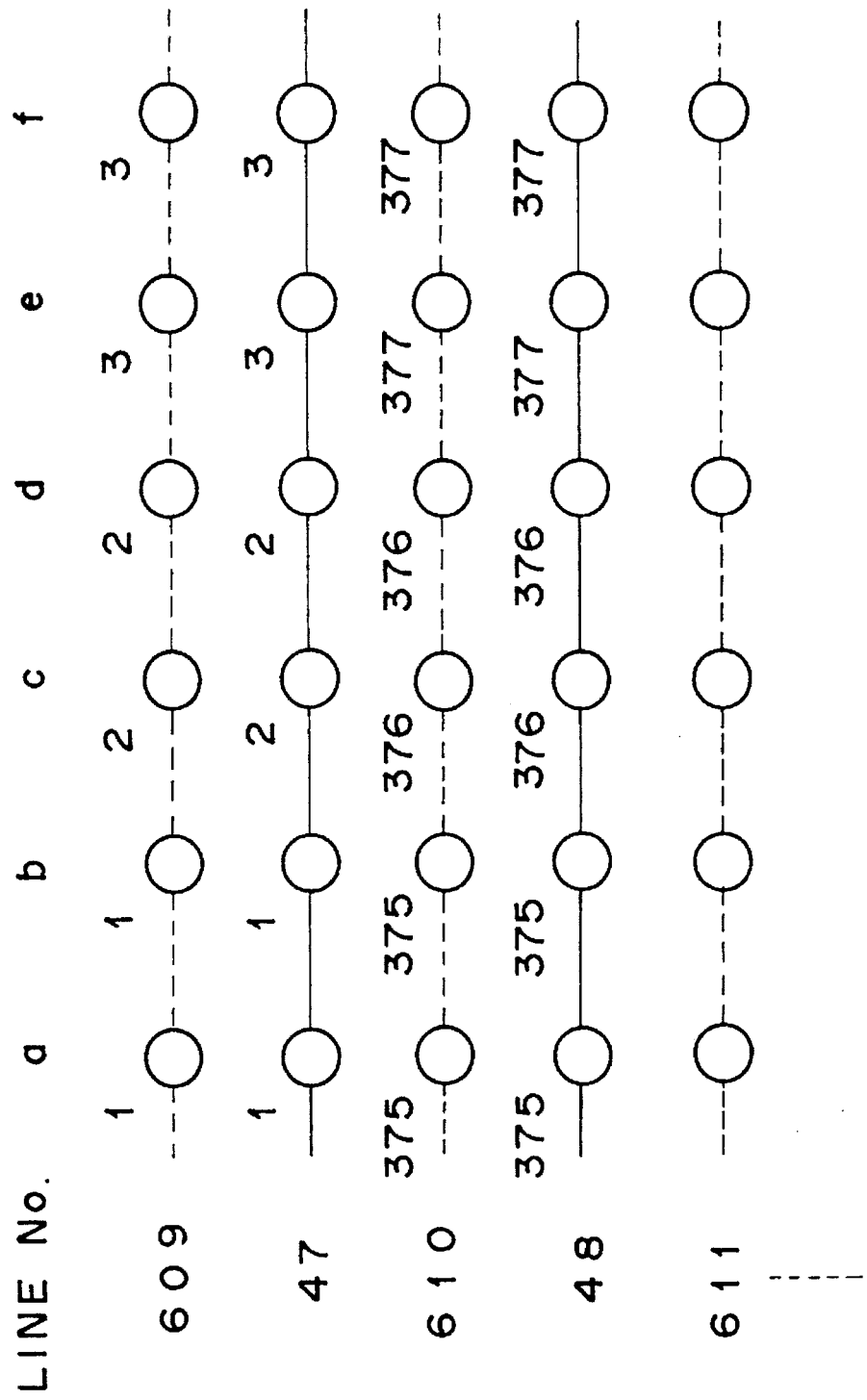

REPRODUCTION APPARATUS FOR VIDEO SIGNALS ACCOMPANIED BY CONTROL INFORMATION

This is a continuation application under 37 CFR 1.62 of prior application Ser. No. 07/909,699, which was filed on Jul. 7, 1992 (aban.)

BACKGROUND OF THE INVENTION

1. Field of the Invention

The present invention relates to a video signal reproducing apparatus, and more particularly to an apparatus for reproducing video signals representative of a movie image to which control information is added for every image plane.

2. Related Background Art

As a system for compression-encoding a movie image with high efficiencies, a system which utilizes a correlation between fields or frames, that is, in the direction of time axis has been developed. In such encoding system as this, since the correlation in the direction of time axis is generally high in a still image or the image which has little movement, high efficiencies will be obtained for the case where the encoding is performed based on the image information of the past. However, since the correlation in the direction of time axis becomes low for the image which moves violently, it is a general practice to perform the encoding according to the processing only within the field/frame. Decision for such encoding may generally be effected by detecting the movement of input images at the time of encoding. Upon transmission of a movie image signal encoded as above, it is a general method to transmit the detected movement information as additional data (hereinafter also referred to as movement data) which is part of control information needed at the time of encoding by use of a data format added to the image data.

As this type of movie image encoding system, a MUSE (Multiple Sub-Nyquist Sampling Encoding) system is known. A control signal included in a MUSE signal contains movement information such as mode information, magnitude information representing the degree of movement, and direction information representing the direction of movement, and the encoding of the MUSE signal is performed based on these movement information. That is, mode data is produced through mode judgement for a still mode (still image plane), a movie image mode (movie image plane) and a scene change mode, movement vector data is produced based on the magnitude information and the direction information, and the encoding is performed according to these mode data and movement vector data. These mode data and movement vector data are added to movie image data in every field. This added data is used for adaptive processing at the time of decoding. By the way, the abovementioned movement vector data is formed to perform the encoding by using the image data of the previous image plane despite the movie image mode, in the event of uniform movement due to panning or the like of a camera, and added to the encoded movie image data.

The movement data generated when the movie image signal is encoded will be herein explained in detail in conjunction with FIG. 1. In this figure, N, N+1, N+2 and N+3 diagrammatically represent successive field image planes in the video signals indicative of movie image. The mode data and movement vector data that are movement data used for encoding such successive field image planes are shown respectively at the under side of each image plane. For simplicity of explanation, it is assumed that patterns before N and after N+3 are at rest with respective similar patterns and there are three types of modes, that is: a still mode in which a still image continues; a movie mode in which there is any movement within the image plane; and a scene change mode in which the pattern changes to an entirely different pattern, and it is also assumed that the movement vector has a value of horizontal direction x and of vertical direction y when there was an uniform movement within the image plane. Hereinafter, the same applies to examples described in the text.

In the first image plane indicated by N, since the preceding condition is assumed to be a still image plane, it corresponds to a still mode, and the movement data specified as movement vector is (0, 0). In the next image plane represented by N+1, it changes to a movie mode provided that there was a partial movement within the image plane, but the movement vector remains unchanged (0, 0). In the image plane indicated by N+2, the mode remains in the movie mode, but the movement vector changes to (x, y) provided that there was an uniform movement due to the panning or tilt of the camera. In the still another image plane indicated by N+3, it changes to a scene change mode provided that the pattern has changed to an entirely different pattern and the movement vector becomes (0, 0).

Shown in the upper part of FIG. 2 are the results of encoding process of the movie image based on the movement data generated as mentioned above. Assume that n, n+1, ... are movement data corresponding to the image data Dp in each field shown by N, N+1, ..., and also correspond to the mode and movement vector in FIG. 1. In addition, in the abovementioned MUSE system, when the image data Dp is recorded in the order shown by N, N+1, ..., the format of transmission signal will become such a format that can be obtained by adding the movement data corresponding to the image data Dp in the subsequent field to the image data Dp in each field, but the movement data in the figure is shown as one to which the corresponding image data Dp is added, for the sake of simplicity of explanation.

If the transmission signal formatted as described above and recorded in an image recording-reproducing apparatus is reproduced in the order different from that used at the time of recording such as in the case of reverse reproduction, for example, the combination of the image data Dp and the movement data Dm will be reproduced without any change as shown in the lower part of FIG. 2. Because of this, if the image data Dp in each field recorded in the order of N, N+1, ..., as shown in FIG. 1 is reproduced in the reverse order, they would be reproduced in the order of N+3, N+2, N+1 and N as shown in FIG. 3, and the movement data Dm takes the specific form that is shown in the lowermost part of FIG. 3 and different from the intrinsic form shown in the middle part thereof.

As discussed above, in the case of the conventional movie image signal reproducing apparatus, the movement data obtained through the reproduction of movie image in the order different from that used at the time of recording, as in the event of reverse reproduction, may differ from the intrinsic movement data, so that the movement data can not be correctly reproduced and a malfunction may occur in the encoding operation, thus leading to any degradation in image quality.

In addition, in the apparatus for recording and reproducing such MUSE signal as this, the output reproduced under the state of normal reproduction (i.e., reproduction at the same speed as that used for recording) is the MUSE signal itself. In order to obtain an original high grade television signal, the reproduced MUSE signal must be decoded by a MUSE decoder. Decoding of the MUSE signal by means of the MUSE decoder is performed with subsampling information that is included in the MUSE signal as control signal.

The control signal in the MUSE signal consists of 32 bits labeled as bit #1–bit #32, of which the bit #9 shows a subsample phase of luminance signal in each field, and the bit #10 prescribes a subsample phase of macro signal. In addition, the bits #16, 17, 18 show movement information, the bit #0 corresponds to normal, the bit #1 shows a perfect still image, the bit #2 shows a semi-still image, the bit #3 corresponds to scene change, and the bits #4–#7 show the degree of movement.

FIG. 4 is a diagram useful for explaining a subsampling pattern of the MUSE signal, wherein the pixels indicated by ○, □, ● and ■ represent the pixels sampled in respective fields defined as 4n, (4n+1), (4n+2) and (4n+3). "n" is any integral number above 0, and the number of each field is denoted as field #4n, field #(4n+1), etc.

However, assuming now that the MUSE recording-reproducing apparatus is operated in the reproduction mode at a speed different from that used for recording, the reproduced output becomes a signal which is far apart from a perfect high grade television signal which can be obtained only by making the round of four fields. In general, in the case of slow reproduction mode at a speed of 1/k, the MUSE signal of one field is repetitively outputted extending over k fields. FIG. 5 shows one example of a sampling pattern of the reproduced output obtained by reproducing the signal of sampling pattern in FIG. 4 under a slow reproduction mode at a speed of ½. As shown in the drawing, the data of field #4n is repetitively outputted extending over two fields. Like these, the data of field #(4n+1), #(4n+2) . . . is outputted extending over two fields, respectively.

In short, in the case of slow reproduction at a speed of ½, the data for two fields only of 4 field periods is outputted. Accordingly, the MUSE decoder restores a high grade television signal from the data of two fields through still image processing or movie image processing. In the case of still image processing by the MUSE decoder, the data on the upper line for every one sample is used for the odd-numbered fields (lines 7, 48, . . . , 562: luminance signal) and the data that must be intrinsically located in the tilt direction may be positioned adjacent to the horizontal direction, thus leading to the degradation in image quality. Whereas, in the case of movie image processing, the image will become obscured, thus making prominent in the event of slow reproduction.

SUMMARY OF THE INVENTION

It is therefore a primary object of the present invention to solve the above mentioned problems.

It is another object of the present invention to provide a video signal reproducing apparatus which is free of the degradation in image quality due to the presence of control information, even when the video signal to which the control signal is added for every image plane is reproduced with a pattern different from the original.

In order to accomplish such objects as mentioned above, according to one preferred embodiment, there is disclosed a video signal reproducing apparatus comprising reproducing means capable of reproducing video signals to which the control information pertaining to an image plane corresponding to every image plane is added and which are recorded in a recording medium, in an array pattern different from that used at the time of recording, substitution means for changing at least a portion of control information added to the video signals reproduced by means of the reproducing means into other information in accordance with the pattern to obtain control information, and signal processing means for processing the video signals reproduced by the reproducing means, by using the control information replaced by the substitution means.

It is a further object of the present invention to provide a video signal reproducing apparatus capable of obtaining excellent video signals by utilization of the correlation between the image planes regardless of the order of the image plane in the event of reproduction.

For such object as mentioned above, according to yet another preferred embodiment of the present invention, there is also disclosed a video signal processing apparatus comprising first means for varying the array pattern of image plane of original video signals to which the control signal pertaining to the image plane corresponding to every image plane is added, second means for changing at least a portion of control information added to the video signals outputted from the first means into other information in accordance with the pattern to obtain control information, and third means for processing the video signals outputted from the first means, by using the control information replaced by the second means.

The foregoing and other objects, features and advantages of the present invention will become more apparent from the following detailed description in conjunction with the drawings.

BRIEF DESCRIPTION OF THE DRAWINGS

FIG. 3 is a view showing problems concerning the movement information of FIG. 2;

FIG. 11 is a view showing the pattern of reproduction signal obtained when it is reproduced slowly by the apparatus shown in FIG. 10.

DETAILED DESCRIPTION OF THE PREFERRED EMBODIMENTS

Figure 1:
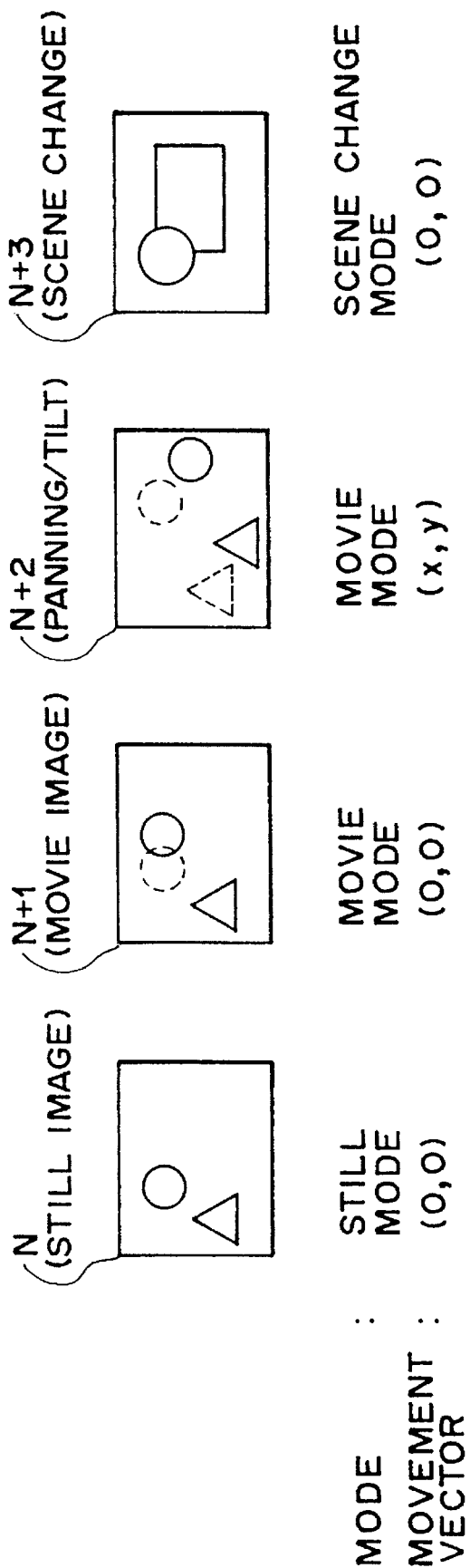
FIG. 1 is a view showing one example of video signals and movement information corresponding to thereto.

The present invention will hereinafter be explained in detail with reference to the preferred embodiments illustrated in the drawings.

In the first embodiment of the present invention, a movie image (video signal) reproducing apparatus reproduces a transmission signal including the movie image data encoded by an encoding circuit to be described later and contains a movement data conversion circuit 2a as an encoding data conversion means shown in FIG. 6 in a reproduction processing circuit.

Figure 2:
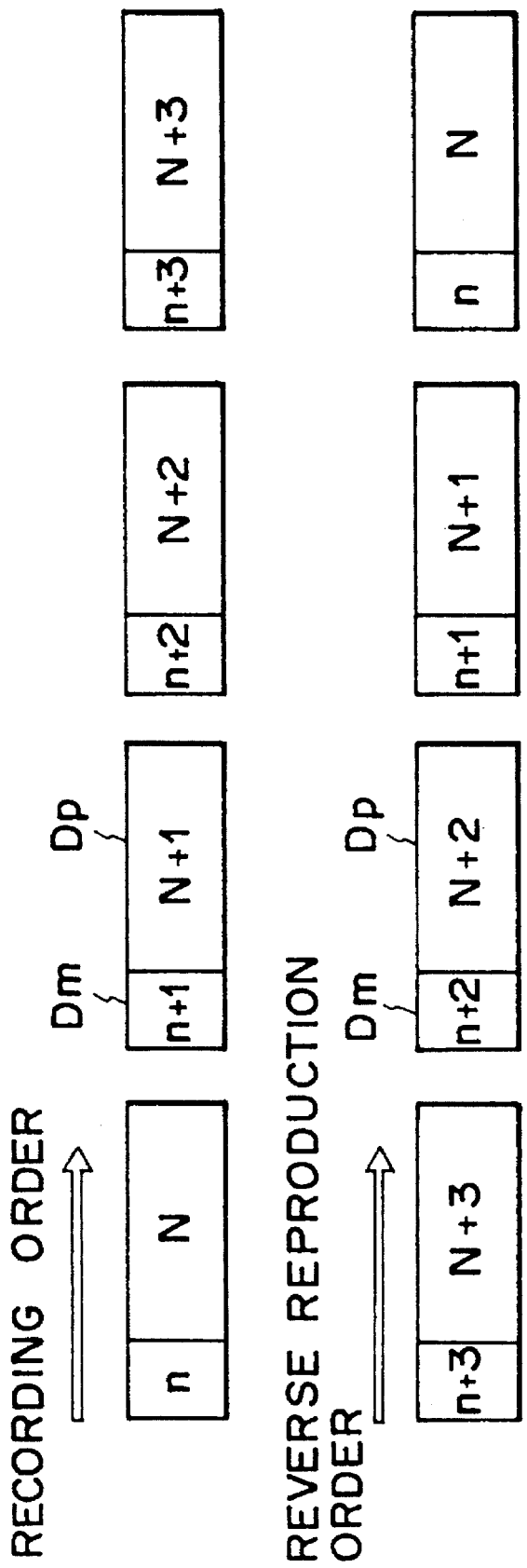
FIG. 2 is a view showing video signals and movement information obtained by reversely reproducing the video signals of FIG. 1.
Figure 4:
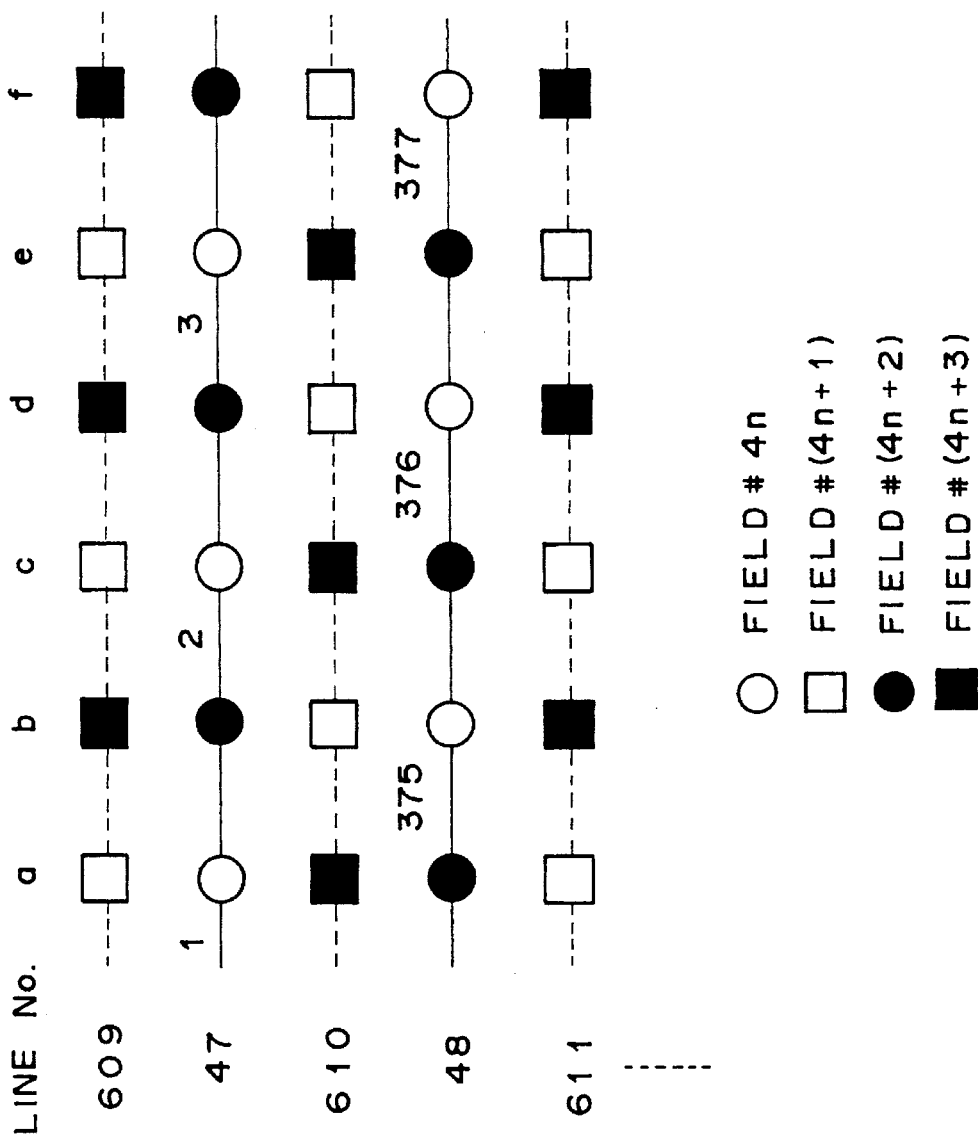
FIG. 4 is a view showing a sampling pattern for a MUSE signal.
Figure 5:
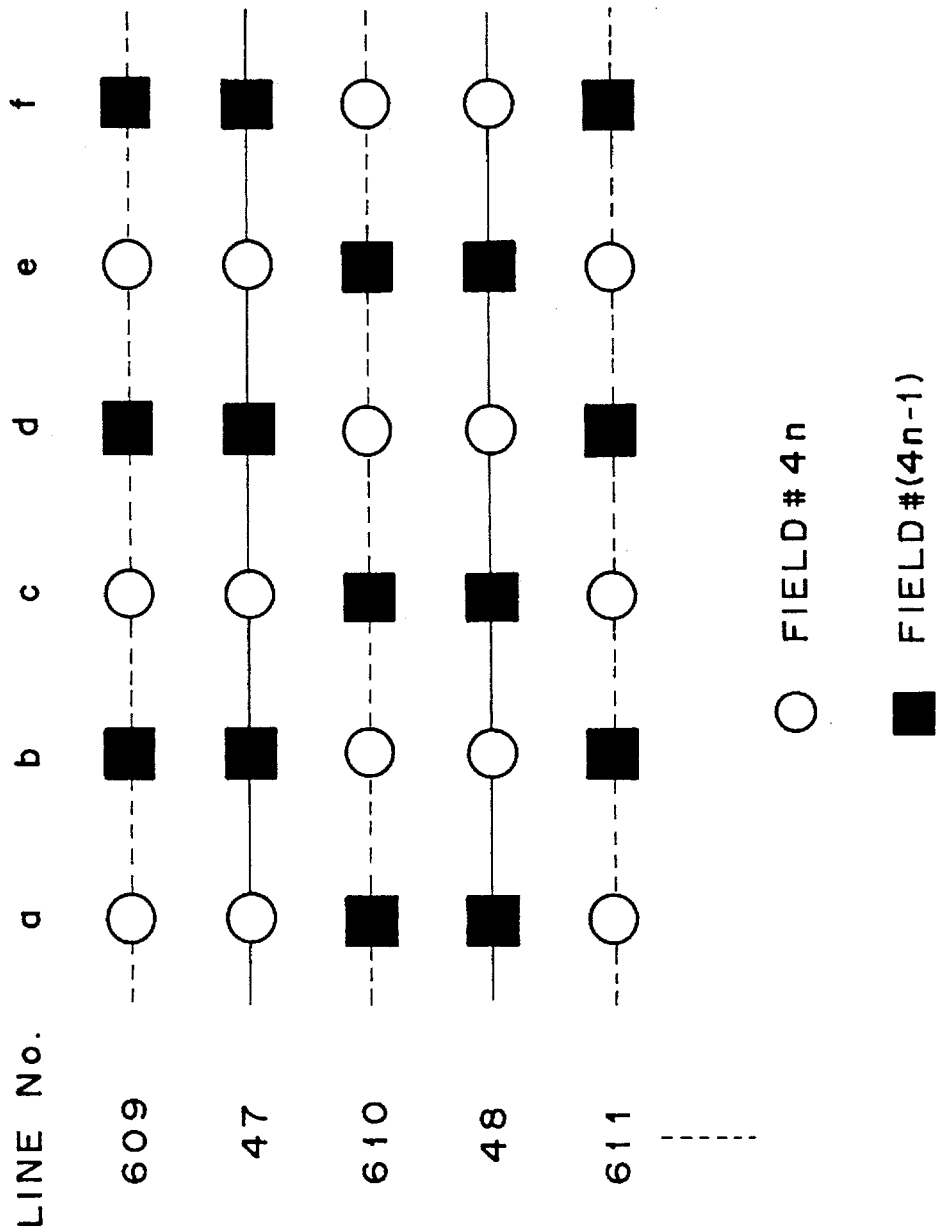
FIG. 5 is a view showing a sampling pattern obtained when the signal of sampling pattern of FIG. 4 is reproduced slowly.

The encoding circuit produces a transmission signal having a format obtained by adding the movement data Dm corresponding to the encoding data represented by n, n+1, . . . to the image data Dp represented by N, N+1, . . . as shown in the upper part of FIG. 2. The reproducing apparatus of this embodiment reproduces, from a magnetic tape T, the signal that has been encoded as mentioned above and recorded in a helical track on the magnetic tape T by use of a rotary head H.

Figure 6:
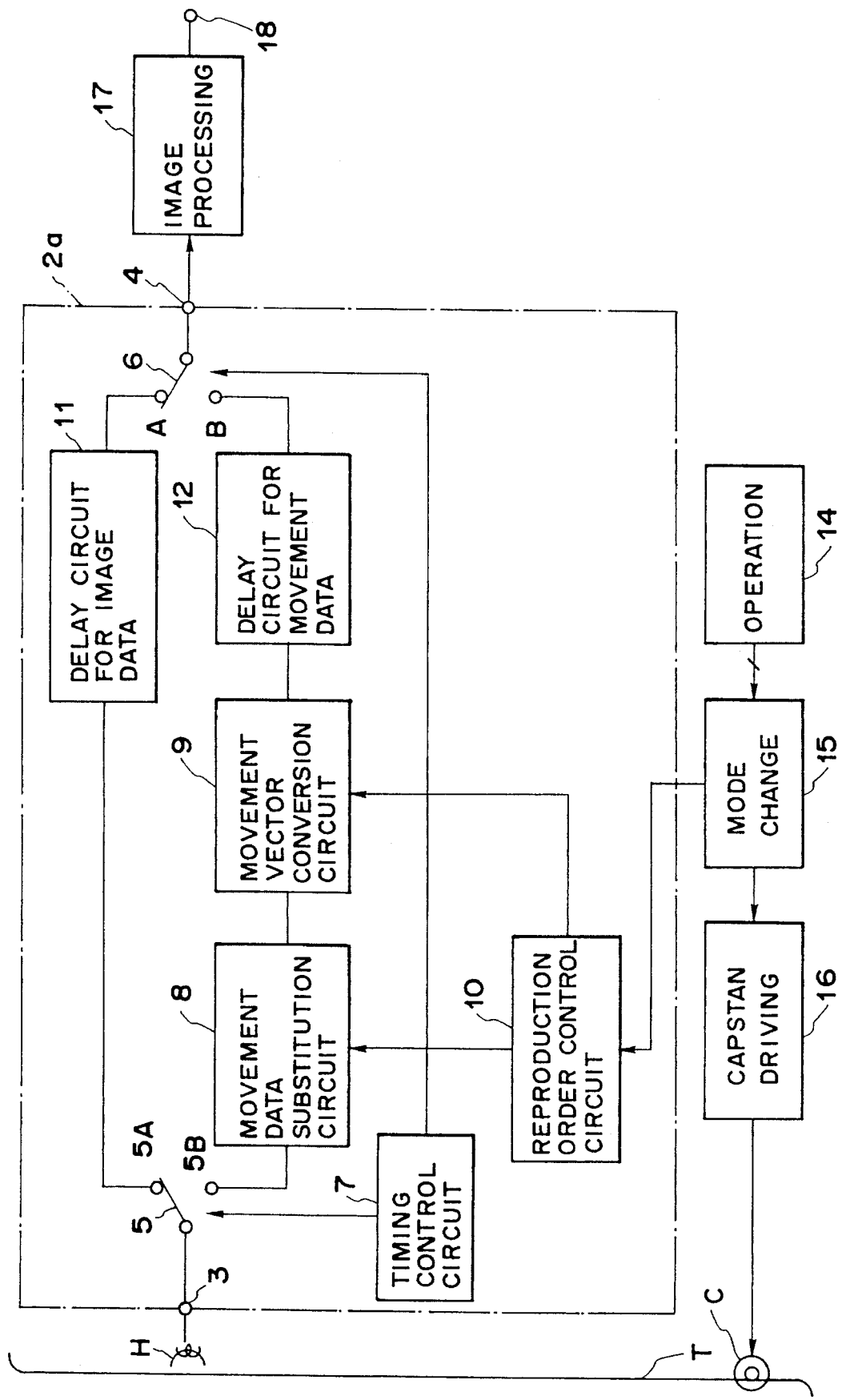
FIG. 6 is a view showing a principal construction of a video signal reproducing apparatus according to one embodiment of the present invention.

In FIG. 6, 14 shows a manual operation key for specifying a reproduction mode, that is, reproduction speed, reproduction direction and others, and 15 shows a mode change circuit for switching the mode of the apparatus according to the instruction from the key 14.

When normal reproduction is instructed by the manual operation key 14, the mode change circuit 15 causes a capstan driving circuit 15 to rotate a capstan C at the same speed in the same direction as that used in the event of recording. Simultaneously with this, the tape T is conveyed at the same speed in the same direction as that used in the event of recording, and each field of video signals is reproduced through the head H in the same order as that used at the time of recording.

At this juncture, a movement data substitution circuit 8 and a movement vector conversion circuit 9 to be described later will output movement data and movement vector as they are without effecting replacement and conversion.

When reverse reproduction operation is instructed by the manual operation key 14, the mode change circuit 15 causes the capstan C to rotate at the same speed as that used at the time of recording, but in the reverse direction. Simultaneously with this, the tape T is conveyed at the same speed as that used at the time of recording, but in the reverse direction. As a result, each field of the video signals will be reproduced through the head H in the reverse order relative to that of recording.

In order to obtain good reproduction signals, it is desirable to periodically displace the rotary head H in the direction of the axis of rotation, and to cause the track locus of the rotary head H to completely coincide with the locus of the recording track.

In the event of such reverse reproduction operation, the movement data conversion circuit 2a converts the movement data Dm added for encoding operation into the movement data Dm coinciding with the reproduction signal. As shown in FIG. 6, the movement data conversion circuit 2a comprises input and output terminals 3 and 4, a timing control circuit 7 for performing the switching control of a movement data separation circuit 5 and a multiplexing circuit 6 coupled to the input and output terminals 3 and 4 respectively, a reproduction order control circuit 10 for controlling a movement data substitution circuit 8 and a movement vector conversion circuit 9 at the time of reverse reproduction and causing them to perform replacement and conversion respectively, a delay circuit 11 for image data which provides a given time lag required for multiplexing the movement data to the image data, and a delay circuit 12 for movement data.

The movement data separation circuit 5 operates to separate the movement data Dm from the reverse reproduction signal (data shown in the upper part of FIG. 7) inputted via the input terminal 3 from the reproducing head H and provides the image data Dp of the inputted reverse reproduction signal to a contact 5A and the movement data Dm to a contact 5B, responding to the switching control by the timing control circuit 7.

The movement data substitution circuit 8 retards the movement data Dm in such a manner that the movement data Dm becomes a correct combination with respect to the image data Dp, based on the control signal from the reproduction order control circuit 10 which follows the mode information from the mode change circuit 15 at the time of reverse reproduction operation. When the movement data Dm (mode data, movement vector data) generated at the time of encoding is reversely reproduced as it is without performing any replacement as shown in FIG. 1, the movement data Dm in each image plane becomes like that shown in the lower part of FIG. 2 and the upper part of FIG. 7, different from the movement data Dm' corresponding to the reproduction video signal indicated in the middle part of FIG. 3. However, there is a predetermined relationship between these movement data Dm and Dm' as shown in FIG. 3. The movement data substitution circuit 8 changes erroneously combined movement data Dm into correct movement data Dm' by utilization of the abovementioned relationship. For example, the movement data Dm of the image plane (N+1) at the time of reverse reproduction when its replacement is not performed is expressed as MOVIE MODE in mode and (0, 0) in movement vector, as shown in the lowermost part of FIG. 3, but formal movement data Dm to be combined with the image plane (N+1) corresponds to the movement data Dm (MOVIE MODE in mode, (x, y) in movement vector) of the image plane (N+2) which is behind one step if the sign of movement vector is neglected. This relationship can also apply to other image planes. Under this condition, the data substitution circuit 8 is operated to delay the movement data Dm by one field period in order to change the movement data Dm of the image plane (N+1) into correctly combined movement data Dm (MOVIE MODE in mode; "x, y" in movement vector).

Figure 7:
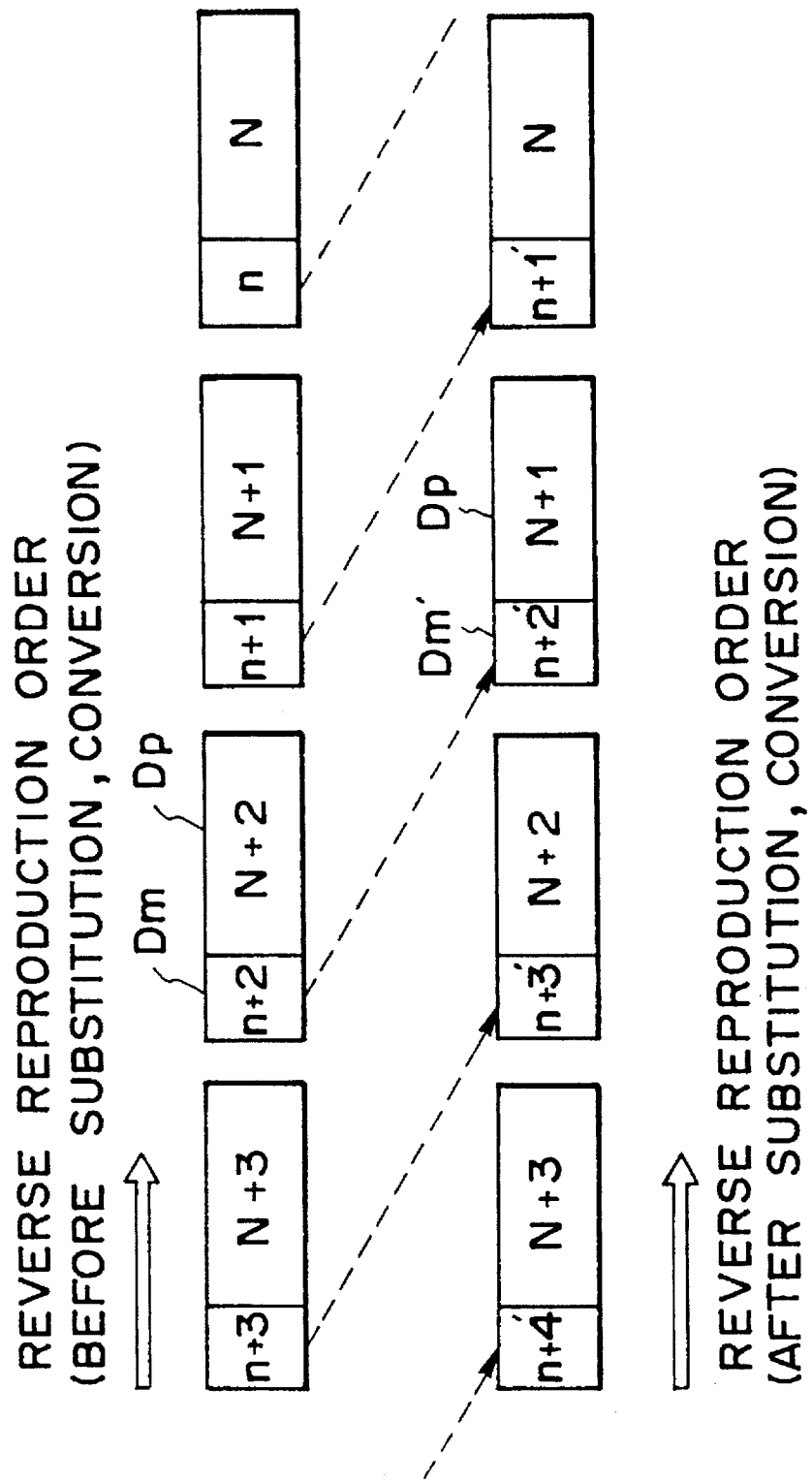
FIG. 7 is a view diagrammatically showing control (movement) information conversion processing operation by the apparatus shown in FIG. 6.

The movement vector conversion circuit 9 effects conversion operation in such that the movement vector is correctly reproduced relative to the reverse reproduction signal based on the control signal from the reproduction order control circuit 10 at the time of reverse reproduction operation. For example, as shown in FIG. 7, the sign of the movement vector (x, y) of the movement data Dm that was correctly combined to be the image plane (N+1) by the movement data substitution circuit 8 is reversed to obtain formal movement vector (−x, −y). Like these, the movement data Dm' of each image plane corresponding to the desired reproduction video signal will be obtained through the replacement and conversion by the movement data substitution circuit 8 and the movement vector conversion circuit 9, respectively.

The image data delay circuit 11 and the movement data delay circuit 12 provides time lags required for performing the multiplexing of the image data Dp and the movement data Dm and each data Dp, Dm is inputted to the multiplexing circuit 6 at the predetermined timing suitable for multiplexing operation. The multiplexing circuit 6 executes, under the control instruction from the timing control circuit 7, the multiplexing operation for the movement data Dm and the image data Dp to which the predetermined time lags are provided by the delay circuits 11 and 12, and then supplies the result of multiplexing to the output terminal 4.

Referring also to FIG. 7, there will be explained a sequence of operation of the video signal reproducing apparatus according to the first embodiment constituted as above. In addition, it is assumed that the movie image to be recorded has been encoded by adding the movement data Dm to the image data Dp as shown in the upper part of FIG. 2, so that the following explanation is centered on the reverse reproduction operation for the movie image.

The reverse reproduction signal is inputted by way of the input terminal 3 from the reproducing head H to the movement data separation circuit 5 of the movement data conversion circuit 2 in field unit as shown in the upper part of FIG. 7. The movement data separation circuit 5 supplies the image data Dp of the inputted reproduction signal to the terminal 5A and supplies the movement data Dm to the terminal 5B, in response to the switching control instruction from the timing control circuit 7. The image data Dp supplied to the terminal 5A is provided with a predetermined time lag by means of the image data delay circuit 11 and inputted to the multiplexing circuit 6.

On the other hand, the movement data Dm supplied to the terminal 5B is inputted to the movement data substitution circuit 8. The movement data substitution circuit 8 replaces the inputted movement data Dm with the movement data Dm preceding one field at the time of the reverse reproduction as shown in FIG. 7, based on the control signal from the reproduction order control circuit 10. Next, when the replaced movement data Dm is inputted to the movement vector conversion circuit 9, the movement vector conversion circuit 9 selects formal movement data Dm' (n', n+1', ... ) whose sign of movement vector is reversed from the movement data Dm (n, n+1, ... ) based on the control signal from the reproduction order control circuit 10, and supplies the selected data to the delay circuit 12. The delay circuit 12 provides the inputted formal movement data Dm' to the multiplexing circuit 6. Inputting of data to the multiplexing circuit 6 will be effected in such a manner that the formal movement data Dm' can be added to the image data Dp to be combined. The multiplexing circuit 6 executes the multiplexing operation of the inputted image data Dp and the formal movement data Dm' as shown in the lower part of FIG. 2 under the control instruction from the timing control circuit 7 and provides it to the output terminal 4. This formal movement data Dm' undergoes adaptive processing at the time of decoding in the later stage, and the reverse reproduction image having little degradation in image quality can be formed through normal decoding operation.

According to the first embodiment mentioned above, the movement data Dm' at the time of reverse reproduction becomes equal to the intrinsic movement data Dm' shown in the middle part of FIG. 3, so that the degradation in image quality at the time of reverse reproduction may be prevented, because there is no malfunction in its decoding operation. In addition, the movement data substitution circuit 8 can be constructed by means of a D flip-flop or the like, as only several bites are sufficient for the movement data Dm per field. For example, it is sufficient to retard the movement data Dm by only one field. The movement vector conversion circuit 9 can be realized by simple hardware as conversion may be performed by causing it to pass through an ordinary sign reversing circuit.

Figure 8:
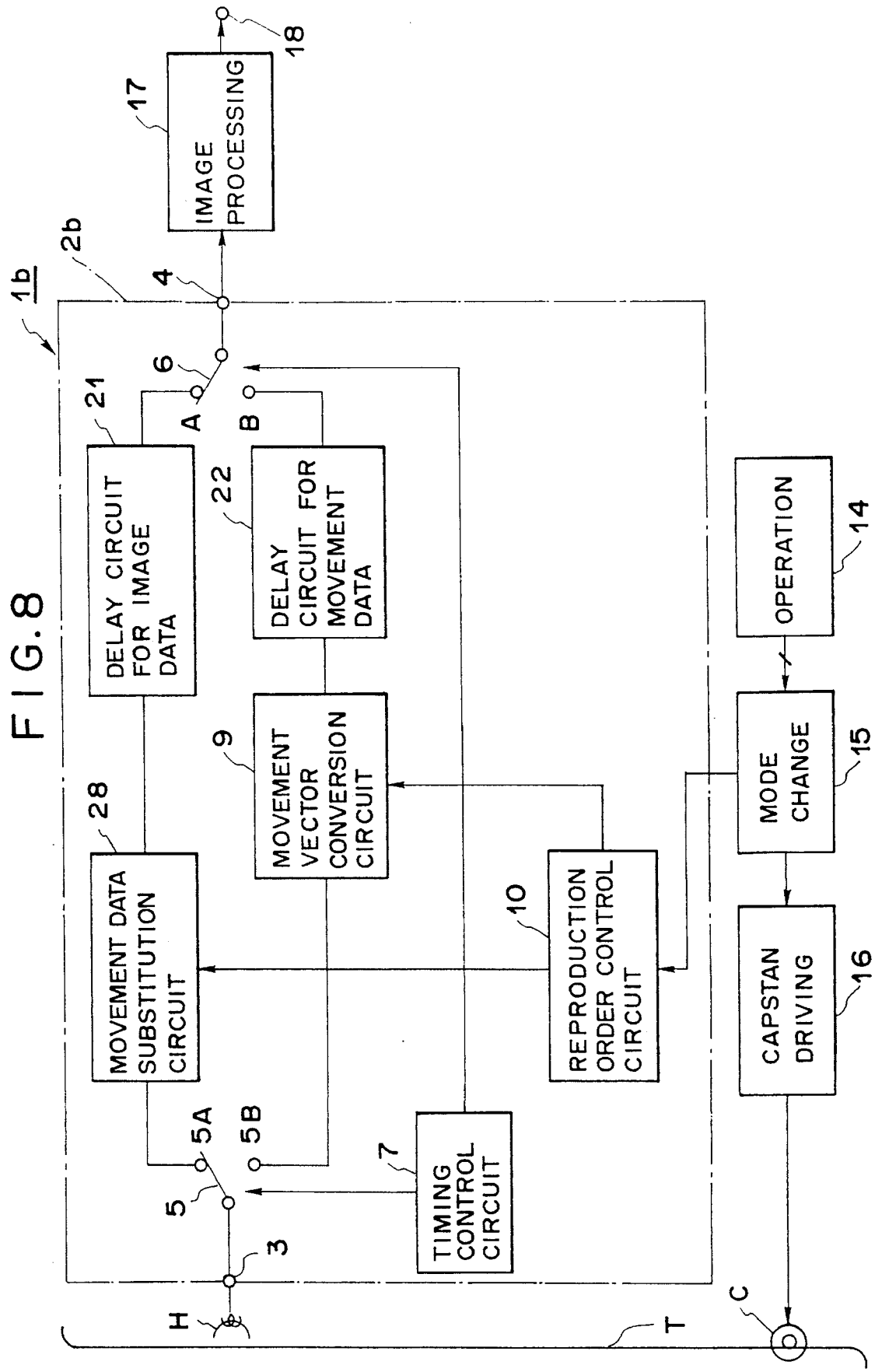
FIG. 8 is a view showing a principal construction of a video signal reproducing apparatus according to another embodiment of the present invention.

Next, a movie image reproducing apparatus according to the second embodiment of the present invention will be explained by referring to FIG. 8. This movie image reproducing apparatus 1b operates to reproduce the transmission signals that have been encoded by an encoding circuit to be described later, and contains the movement data conversion circuit 2b within the reproducing circuit. Explanation on all the similar constituents denoted by the same reference numerals as that used in FIG. 6 is omitted for the sake of simplicity.

The encoding circuit of this embodiment operates to constitute transmission signals using a format obtained by adding the movement data Dm to the image data Dp preceding one field upon recording of the image. For example, the transmission signals can be obtained by adding the movement data Dm shown by n+1 corresponding to the image data Dp shown by N+1 to the image data Dp shown by N preceding one field.

Like the movie image reproducing apparatus 1a according to the first embodiment, the movement data conversion circuit 2b comprises input and output terminals 3 and 4, a movement data separation circuit 5, a multiplexing circuit 6, a timing control circuit 7, a movement vector conversion circuit 9 and a reproduction order control circuit 10. In addition, it comprises an image data delay circuit 21, a movement data delay circuit 22 and a movement data substitution circuit 28.

Since this movement data conversion circuit 2b during the normal reproduction does not perform the replacement and conversion of the data or the like, only the operation for reverse reproduction will hereinafter be explained.

Figure 9:
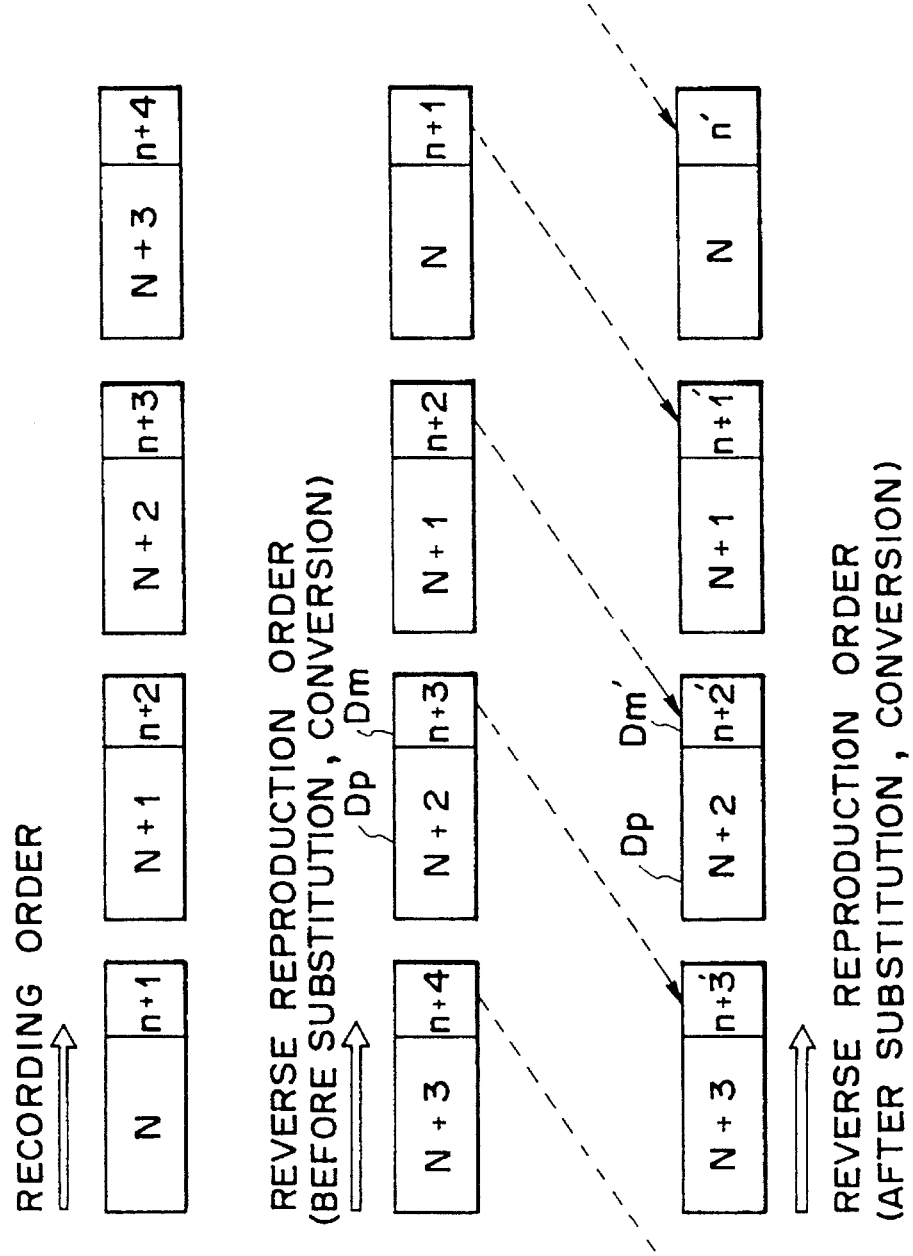
FIG. 9 is a view diagrammatically showing control (movement) information conversion processing operation by the apparatus shown in FIG. 8.

The movement data substitution circuit 28 retards the image data Dp in such that the movement data Dm is correspondingly combined with the reproduction image data Dp based on the control signal from the reproduction order control circuit 10 at the time of reverse reproduction. When the movement data Dm generated at the time of recording is reproduced in a reverse form as it is without replacement as shown in the upper part of FIG. 9, the movement data Dm for each image becomes one that is different from the movement data Dm correspondingly combined with the reproduction signal in the same manner as in the conventional example, as shown in the middle part of FIG. 9. However, in a similar manner as the first embodiment, there is a predetermined relationship between these movement data Dm as shown in FIG. 9. The movement data substitution circuit 8 changes erroneously combined movement data Dm into correctly combined movement data Dm by utilization of the abovementioned relationship. Since the movement data Dm has been added to each image data Dp preceding one field at the time of recording, the movement data Dm is retarded by one field at the time of reverse reproduction as shown in the middle part of FIG. 9, so that the image data expressed by plus and minus signs will be retarded by two fields. Accordingly, like the first embodiment, the movement data Dm to be combined with the image data Dp indicated by N+2, for example, must be made to be the movement data Dm indicated by n+2 that has been added to the image data Dp indicated by N+1 preceding one field (2–1). For this reason, in the second embodiment, the movement data Dm (n, n+1, ... ) is advanced by one field to obtain Dm' (n', n+1', ... ) and added to the image data Dp. For example, the image data Dp is retarded by one field period in order to change the movement data Dm indicated by n+3 to the movement data Dm' (n+2').

Simultaneously with this, the movement vector conversion circuit 9 performs conversion operation in the same manner as the apparatus of the first embodiment, to obtain formal movement data Dm' in the same manner as the apparatus 1a of the first embodiment by reversing the sign of the movement data Dm. The image data Dp to be combined and the formal movement data Dm' are respectively retarded by predetermined amounts through the image data delay circuit 21 and the movement data delay circuit 22 and inputted to the multiplexing circuit 6.

According to the apparatus of the second embodiment as described above, there can be achieved just the same action and effects as the first embodiment. In addition, the movement data substitution circuit 28 is simply realized by using a field delay circuit for image data, for example, utilizing a field memory and the like.

While there has been described only reverse reproduction operation with reference to the first and second embodiments, similar effects may be expected by performing additional information conversion suited to respective fashion even in other reproduction operation including double speed reproduction and reverse double speed reproduction and others.

As explained above, according to the first and second embodiments mentioned above, since, even in the case where the movie image signals in each field are reproduced in an order different from that used at the time of recording, additional data relating to image change provided at the time of encoding is converted into additional data to be intrinsically provided to the image data in response to the image change of its reproduction signal, its decoding operation may be performed without malfunction, and the reproduced image having little degradation in image quality may be formed.

Hereinafter, there will be explained the third embodiment of the present invention in conjunction with the annexed drawings.

Figure 10:
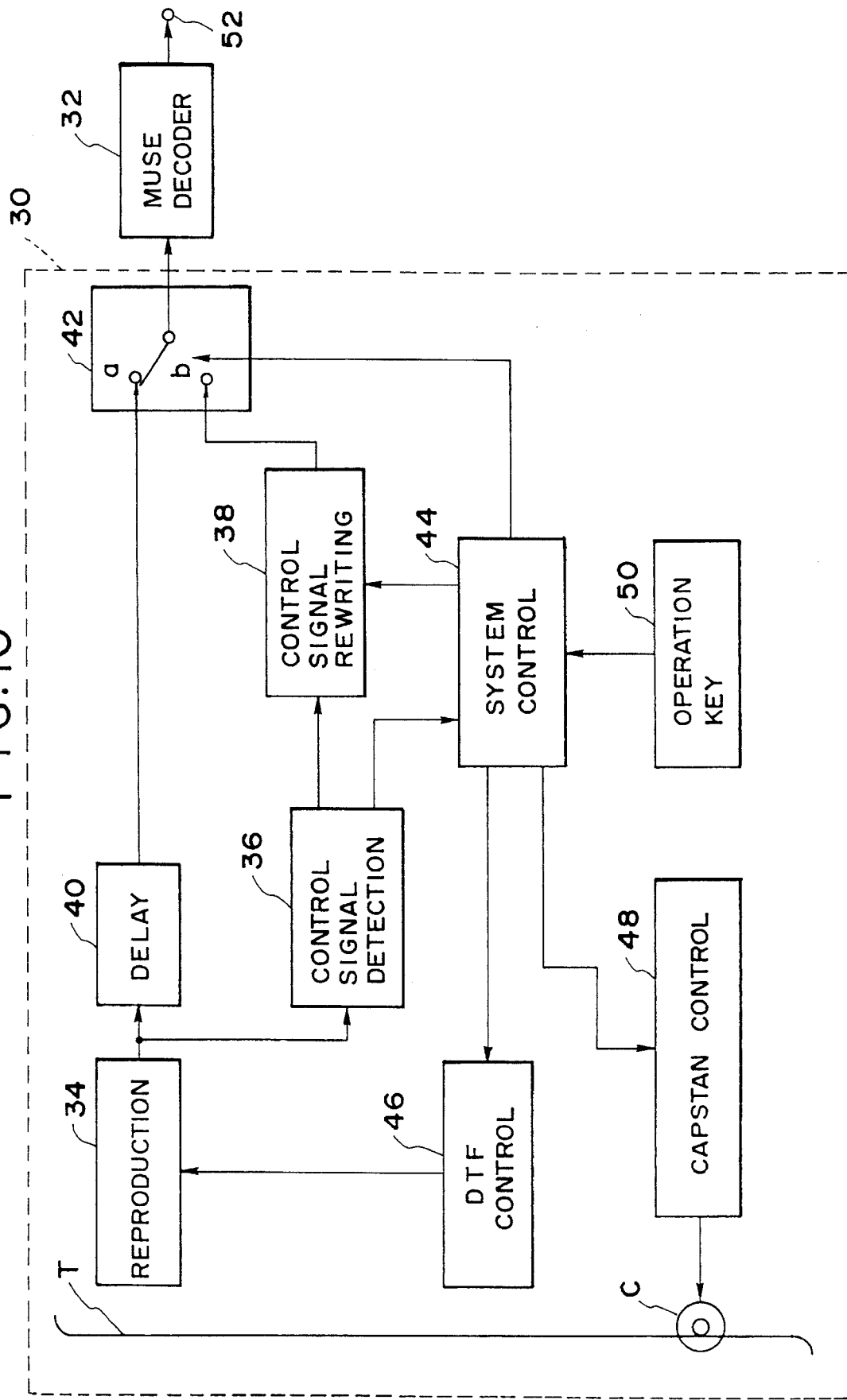
FIG. 10 is a view showing a principal construction of a video signal reproducing apparatus according to still another embodiment of the present invention.

FIG. 10 shows a circuit block diagram for the third embodiment of the present invention comprising a MUSE signal reproducing apparatus 30 and a MUSE decoder 32. The MUSE signal reproducing apparatus 30 comprises a reproducing circuit 34 for reproducing the MUSE signal from a magnetic tape T by means of the rotary head, a control signal detection circuit for detecting a control signal from the MUSE signal provided by the reproducing circuit 34, and a control signal rewriting circuit 38 for rewriting the control signal provided by the control signal detection circuit 36.

In addition, the MUSE signal reproducing apparatus 30 comprises a delay circuit 40 for allowing the output of the reproducing circuit 34 to retard by the period of time corresponding to signal delay due to the control signal detection circuit 36 and the control signal rewriting circuit 38, and a switch 42 which is normally connected to a contact "a" and switched to a contact "b" for a predetermined time interval in response to the switching control signal from a system control circuit 44 to be described later. More specifically, during normal reproduction operation, the switch 42 always selects the output of the delay circuit 40. However, in a special reproduction mode, the switch 42 switches to the contact "b" with only a portion of control signal of the MUSE signal provided by the delay circuit 40, thereby allowing the output of the control signal rewriting circuit 38 to be substituted for. The output of the switch 42 is used as output of the reproducing apparatus 30.

When normal reproduction is instructed by the actuation of an operation key 50, the system control circuit 44 causes a capstan control circuit 48 to rotate the capstan C at the same speed of rotation in the same direction as that used in the event of recording. In the case of normal reproduction operation, the MUSE signal outputted from the reproducing circuit 34 is applied to the MUSE decoder 32 as it is by way of the delay circuit 40 and the switch 42. In other words, the switch 42 is always connected to the contact "a" in response to the instruction from the system control circuit 44. Accordingly, the reproduced signals from the switch 42 correspond to the original MUSE signals so that the MUSE decoder 32 decodes the MUSE signals and then outputs high grade television signals.

Next, there will be explained special reproduction in the VTR according to the third embodiment.

When the special reproduction mode is instructed by actuation of the operation key 50, the system control circuit 44 controls the capstan control circuit 48 to drive the capstan C at the designated speed. As the result, the tape T travels at the desired speed.

In the embodiment, since the rotary head in the reproduction circuit 34 is driven by an actuator such as a bimorph element and a voice coil and the like to cause it to trace in parallel with the helical track, good reproduction signals can be obtained. The DTE control circuit 46 controls the operation of the actuator in response to the reproduction speed instructed by the system control circuit 44.

In addition, in this embodiment, it is assumed that one helical track on the tape contains the MUSE signals of one field, and the MUSE signals are reproduced by the actuator in one field regardless of its reproduction speed.

The slow reproduction operation at speeds of less than ¼ times the normal speed will hereinafter be explained. The control signal detection circuit 36 detects a control signal that has been included in the MUSE signal of every field from the reproducing circuit 34 and supplies the detected control signal to the control signal rewriting circuit 38. The control signal rewriting circuit 38 rewrites a Y subsample phase of bit #9 in the control signal, a C subsample phase of bit #10, and movement information of bits 16, 17 and 18. More specifically, the Y subsample phase and the C subsample phase are reversed with "0" and "1" for every frame. The movement information is assumed to be a perfect still image in mode 1. In addition to these information bits, there is also another control signal called a inspection bit used for error detection, so that this inspection bit is also rewritten in accordance with the information bit that has been rewritten therein.

The delay circuit 40 retards the reproduced MUSE signal outputted from the reproducing circuit 34 for the time interval corresponding to the operation time of the control signal detection circuit 36 and the control signal rewriting circuit 38. Accordingly, the control signal rewriting circuit 38 rewrites the inputted control signal and outputs it to the contact "b" of the switch 42 at the same timing as that during which the control signal of the MUSE signal is inputted to the contact "a". The system control circuit 42 switches the switch 42 to the contact "a" at the timing that the control signal is provided to the contacts "a", "b" of the switch 42 in response to the detection timing of the control signal by the control signal detection circuit 36. As the result, the control signal of the reproduced MUSE signal is replaced by the control signal rewritten by the control signal rewriting circuit 38.

For example, assuming now that the MUSE signal having the pattern shown in FIG. 7 is reproduced in slow mode, the signal becomes as shown in FIG. 11. In other words, if the data of field recorded on the magnetic tape with the condition that the Y subsample phase is "0", the sampling data at the horizontal position "a" on the line of No. 47 is, as indicated in FIG. 11, inlaid in the horizontal position "b" on the line of No. 47 in the first field, and also inlaid in the horizontal position "a" on the line of No. 609 in the second field. Then, the Y subsample phase is rewritten to "1", and inlaid in the horizontal position "b" on the line of No. 47 in the third field, and in the horizontal position "b" on the line of No. 609 in the fourth field. This also applies to other data and is repeated for successive data as well.

The MUSE decoder 12 performs movie/still image processing in accordance with the control signal included in the MUSE signal from the switch 22. In the case of slow reproduction, the movement information within the control signal is rewritten into a perfect still image mode, so that the MUSE decoder 12 performs the still image processing. Accordingly, from the MUSE decoder 12, sharp high grade television signals with no obscureness can be obtained.

In the case of slow reproduction operation relatively close to the normal reproduction operation at speeds of more than ⅓ times the normal speed, the control signal rewriting circuit 18 rewrites the movement information of bits #16, 17 and 18 in the control signal into one of levels 4–7 representing the degree of movement, thereby obtaining good movie image with little obscureness.

While there has been explained the operation of slow reproduction mode, it goes without saying that the similar effects can be obtained by rewriting the control signal, even in the case of frame speed reproduction as well as high speed search reproduction operation.

As readily understood from the foregoing, according to the present invention, the reproduced image with little degradation in image quality can be obtained from the MUSE signal reproduced at speeds different from that used at the time of recording.

What is claimed is:

1. A video signal reproducing apparatus, comprising:

(a) reproducing means for reproducing video signal recorded on a recording medium, said video signal including a plurality of image planes to each of which is added control information of a corresponding image plane, the control information including information related to motion between the plurality of image planes, and said reproducing means being able to perform slow motion reproduction of said video signal;

(b) conversion means in response to performing the slow motion reproduction by said reproducing means, for changing at least a portion of the control information added to each image plane of the reproduced video signal so that said motion is reduced thereby; and signal processing means for processing the video signals reproduced by said reproducing means, by using the control information changed by said conversion means.

2. An apparatus according to claim 1, wherein said control information includes the movement information representing the presence of movement of the image of said video signals.

3. An apparatus according to claim 2, wherein said reproducing means has a reverse reproduction mode in which said video signals are reproduced in the order of image plane opposite to that used at the time of recording of said video signals, and said conversion means changes the movement information of said each image plane into the movement information of the adjacent image plane, when said reproducing means is in said reverse reproduction mode.

4. An apparatus according to claim 2, wherein said movement information represents any one of a still mode indicating that there is substantially no movement of the image, a movement mode indicating that there is movement in a predetermined direction, and a scene change mode that indicates a change over to an utterly different image plane.

5. An apparatus according to claim 2, wherein said reproducing means has a slow motion reproduction mode for reproducing the same image plane by a plurality of times, and said conversion means changes the movement information of said each image plane into the information representing that there is substantially no movement of the image plane, when said reproducing means is in said slow motion reproduction mode.

6. An apparatus according to claim 1, wherein said control information includes the movement vector information representing a direction of movement of the image of said video signals.

7. An apparatus according to claim 6, wherein said reproducing means has a reverse reproduction mode for reproducing said video signals in the order of image plane opposite to that used at the time of recording, and said conversion means changes the movement vector information of said each image plane into the information in a reversed form of movement vector information of the adjacent image plane, when said reproducing means is in said reverse reproduction mode.

8. An apparatus according to claim 6, wherein said reproducing means has a slow motion reproduction mode for reproducing the same image plane by a plurality number of times, and said conversion means changes the movement vector information of said each image plane into the information representing that there is substantially no movement of the image, when said reproducing means is in said slow motion reproduction mode.

9. An apparatus according to claim 1, wherein said control information includes the positional information representing one of a plurality of sampling positions of said video signals.

10. An apparatus according to claim 9, wherein said reproducing means has a slow motion reproduction mode for reproducing the same image plane by a plurality number of times, and said conversion means changes the positional information of said each image plane into the information with which said plurality of sampling positions are cyclically switched for every image plane, when said reproducing means is in said slow motion reproduction mode.

11. A video signal processing apparatus, comprising:

(a) first means for outputting an original video signal including a plurality of image planes to each of which is added control information of a corresponding image plane in a predetermined order, the control information including information related to motion between the plurality of image planes, and said first means being able to change update speed of the plurality of image planes;

(b) second means in response to change of the update speed by said first means to a speed slower than a predetermined speed, for changing at least a portion of the control information added to each image plane of the outputted video signal so that said motion is reduced thereby; and (c) third means for processing the video signals outputted from said first means, by using the control information changed by said second means.

12. An apparatus according to claim 11, wherein said control information includes the movement information representing the presence of movement of the image of said video signals.

13. An apparatus according to claim 12, wherein said second means changes the movement information of said each image plane into the movement information of the adjacent image plane, when said first means is outputting said original video signals in reverse order with respect to the image plane.

14. An apparatus according to claim 12, wherein said second means changes the movement information of said each image plane into the information representing that there is substantially no movement of the image, when said first means is outputting the same image plane of said original video signals a plurality number of times at time.

15. An apparatus according to claim 11, wherein said control information includes the movement vector information representing a direction of and an amount of image movement of said video signals.

16. An apparatus according to claim 11, wherein said control information includes the positional information representing one of a plurality of sampling positions of said video signals.

17. A video signal reproducing apparatus, comprising:
   (a) reproducing means for reproducing video signals from a tape-like recording medium, the video signal recorded on the recording medium including a plurality of image planes to each of which is added control information of a corresponding image plane, said control information including information as to motion between the plurality of image planes;
   (b) conveyance means for conveying said tape-like recording medium in its longitudinal direction, said conveyance means being able to change conveyance speed of the recording medium;
   (c) conversion means in response to change of the conveyance speed by said conveyance means to a speed slower than a conveyance speed at recording of the video signal, for changing the control information added to each image plane of the reproduced video signal so that said motion is reduced thereby; and
   (d) signal processing means for processing the video signals reproduced by said reproducing means, by using the control information changed by said conversion means.

18. An apparatus according to claim 17, wherein said control information includes the movement information representing the presence of image movement of said video signals.

19. An apparatus according to claim 18, wherein said conversion means changes the movement information of said each image plane into the movement information of the adjacent image plane, when said conveyance means is conveying said tape-like recording medium at the same speed in the direction opposite to that used in the event of recording.

20. An apparatus according to claim 18, wherein said movement information represents any one of a still mode indicating that there is substantially no movement of the image, a movement mode indicating that there is movement in a predetermined direction, and a scene change mode indicating the change over to an utterly different image plane.

21. An apparatus according to claim 20, wherein said conversion means changes the movement information of said each image plane into the information indicating that there is substantially no movement of the image, when said conveyance means is conveying said tape-like recording medium at speeds slower than that used at the time of recording.

22. An apparatus according to claim 17, wherein said control information includes the movement vector information representative of the direction of image movement of said video signals.

23. An apparatus according to claim 22, wherein said conversion means changes the movement vector information of said each image plane into the information in a reversed form of movement vector information of the adjacent image plane, when said conveyance means is conveying said tape-like recording medium at the same speed in the direction opposite to that used in the event of recording.

24. An apparatus according to claim 23, wherein said vector information also represents an amount of image movement of said video signals.

25. An apparatus according to claim 24, wherein said conversion means changes the movement vector information of said each image plane into the information indicating that there is substantially no movement of the image, when said conveyance means is conveying said tape-like recording medium at speeds slower than that used at the time of recording.

26. An apparatus according to claim 17, wherein said control information includes the positional information indicating one of a plurality of sampling positions of said video signals.

27. An apparatus according to claim 26, wherein said conversion means changes the positional information of said each image plane into the information with which said plurality of sampling positions are switched cyclically for every image plane, when said conveyance means is conveying said tape-like recording medium at speeds slower than that used at the time of recording.

28. A video signal processing apparatus, comprising:
   (a) input means for inputting a video signal including a plurality of image planes to each of which is added control information of a corresponding image plane in a predetermined order, said control information including information related to movement between the plurality of image planes, and said input means being able to change update speed of said plurality of image planes; and
   (b) processing means for processing the video signal inputted by said input means, said processing means being able to change a processing operation in accordance with the order of the plurality of image planes and the control information and including conversion means in response to change of the update speed by said input means to a speed slower than a predetermined speed, for changing at least a portion of the control information added to each image plane of the inputted video signal so that said movement is reduced thereby.

29. An apparatus according to claim 28, wherein said processing means performs processing by using said control information.

30. An apparatus according to claim 28, wherein said control information includes movement information representing the presence of movement of the image of said video signals.

31. An apparatus according to claim 28, wherein said input means has a reverse reproduction mode in which said video signals are inputted in the order of picture planes opposite to that used at the time of recording of said video signals, and said conversion means changes the movement information of the adjacent image plane into the movement information of the adjacent image plane, when said input means is in said reverse input mode.

32. An apparatus according to claim 30, wherein said movement information represents any one of a still mode indicating that there is substantially no movement of the image, a movement mode indicating that there is movement in a predetermined direction, and a scene change mode that indicates a change over to an utterly different image plane.

33. An apparatus according to claim 28, wherein said control information includes movement vector information representing a direction of movement of the image of said video signals.

\* \* \* \* \*

UNITED STATES PATENT AND TRADEMARK OFFICE
CERTIFICATE OF CORRECTION

PATENT NO. : 5,528,382
DATED : June 18, 1996
INVENTOR(S) : Masato Kato, et al.

It is certified that error appears in the above-indentified patent and that said Letters Patent is hereby corrected as shown below:

On the title page, item [54] and column 1, lines 1-3, change "REPRODUCTION APPARATUS FOR VIDEO SIGNALS ACCOMPANIED BY CONTROL INFORMATION" to -- VIDEO SIGNAL REPRODUCING APPARATUS WITH REPLACEMENT OF CONTROL INFORMATION ADDED TO IMAGE PLANES --.

Signed and Sealed this

Twenty-fourth Day of December, 1996

Attest:

BRUCE LEHMAN

Attesting Officer  Commissioner of Patents and Trademarks